United States Patent
Claudatos et al.

(10) Patent No.: US 8,577,680 B2
(45) Date of Patent: Nov. 5, 2013

(54) MONITORING AND LOGGING VOICE TRAFFIC ON DATA NETWORK

(75) Inventors: Christopher Hercules Claudatos, San Jose, CA (US); William Dale Andruss, Minneapolis, MN (US); Scott R. Bevan, Mountain House, CA (US)

(73) Assignee: EMC Corporation, Hopkinton, MA (US)

( * ) Notice: Subject to any disclaimer, the term of this patent is extended or adjusted under 35 U.S.C. 154(b) by 1167 days.

(21) Appl. No.: 11/648,069

(22) Filed: Dec. 30, 2006

(65) Prior Publication Data

US 2008/0162135 A1 Jul. 3, 2008

(51) Int. Cl.
*G10L 15/06* (2013.01)

(52) U.S. Cl.
USPC .................... 704/243; 704/246; 704/270

(58) Field of Classification Search
USPC .................................................. 704/243, 246
See application file for complete search history.

(56) References Cited

U.S. PATENT DOCUMENTS

| | | | |
|---|---|---|---|
| 5,274,631 A | 12/1993 | Bhardwaj | |
| 5,933,818 A | 8/1999 | Kasravi et al. | |
| 6,026,167 A | 2/2000 | Aziz | |
| 6,370,247 B1 | 4/2002 | Takaragi et al. | |
| 6,522,726 B1 | 2/2003 | Hunt | |
| 6,587,831 B1 | 7/2003 | O'Brien | |
| 6,950,434 B1 | 9/2005 | Viswanath et al. | |
| 6,959,384 B1 | 10/2005 | Serret-Avila | |
| 7,248,680 B1 * | 7/2007 | Gainsboro | 379/189 |
| 7,443,321 B1 | 10/2008 | Kaufman et al. | |
| 7,457,745 B2 * | 11/2008 | Kadambe et al. | 704/216 |
| 7,600,125 B1 | 10/2009 | Stringham | |
| 7,634,657 B1 | 12/2009 | Stringham | |
| 7,676,688 B1 | 3/2010 | Hardman | |
| 2001/0036821 A1 * | 11/2001 | Gainsboro et al. | 455/410 |
| 2002/0071537 A1 * | 6/2002 | Gainsboro | 379/188 |
| 2004/0073617 A1 | 4/2004 | Milliken et al. | |
| 2005/0276385 A1 | 12/2005 | McCormick | |
| 2006/0059173 A1 | 3/2006 | Hirsch et al. | |
| 2006/0111904 A1 * | 5/2006 | Wasserblat et al. | 704/246 |
| 2006/0115061 A1 | 6/2006 | Wilson et al. | |
| 2006/0179141 A1 | 8/2006 | John et al. | |
| 2007/0180275 A1 | 8/2007 | Metzger et al. | |
| 2008/0008302 A1 | 1/2008 | Yim | |
| 2008/0205273 A1 | 8/2008 | Wackerly | |
| 2009/0268632 A1 | 10/2009 | Pabari et al. | |

* cited by examiner

*Primary Examiner* — Angela A Armstrong
(74) *Attorney, Agent, or Firm* — Deepika Bhayana; Thedore A. Chen; Krishnendu Gupta

(57) ABSTRACT

A method, article of manufacture, and apparatus for monitoring data traffic on a network is disclosed. In an embodiment, this includes obtaining intrinsic data from at least a portion of the traffic, obtaining extrinsic data from at least a portion of the traffic, associating the intrinsic data with the extrinsic data, and logging the intrinsic data and extrinsic data. The portion of the traffic from which the intrinsic data and extrinsic data are derived may not be stored, or may be stored in encrypted form.

18 Claims, 2 Drawing Sheets

MONITORING AND LOGGING VOICE TRAFFIC ON DATA NETWORK

CROSS-REFERENCE TO RELATED APPLICATIONS

This application is related to co-pending U.S. patent application Ser. No. 11/648,071 for NETWORK MONITORING and filed concurrently herewith, which is incorporated herein by reference for all purposes.

FIELD OF THE INVENTION

This invention relates generally to network monitoring, and more particularly to systems and methods for logging and archiving network data traffic.

BACKGROUND OF THE INVENTION

This invention relates to a system and method for logging and archiving network data traffic. Business and legal requirements may require monitoring of network data traffic, which may include data packets flowing across the network. For example, anti-terrorism laws may require an Internet Service Provider (ISP) to maintain logs of all Internet traffic of its customers for a prescribed time period. The goals of such laws are to assist law enforcement agencies to investigate potential terrorist activities, including planning and financing. Other goals may include investigating potential lawbreakers and thwarting child pornographers and other internet predators. Investigations into illicit behavior are often hampered because such log data is routinely deleted in the normal course of business. Furthermore, the value of the current log is limited due to the fact that it contains very basic metadata (data about data) and nothing about the data traffic payload. Corporations may use this data to help them better manage their networks and to identify anomalous or unwanted network traffic. This data, however, is subject to the same limitations as described above.

Storing the entire network traffic is technically feasible, but this approach would come at great cost in terms of storage and archival. In addition, the laws of some countries may prohibit inspection of people's data without court approval or other authorization on a case by case basis. Furthermore, even if the entire traffic data were retained, there is no method to efficiently and effectively search the data. In the US, legislation has been enacted and new legislation is proposed to permit limited surveillance in the form of logging. Such logging may keep the names of an ISP's customers and their IP addresses, the IP addresses of the sites to which they connected, and the dates and times of their connections. Because the goal is investigative, the paucity of data limits the value of the log. For example, if investigators were to have the entire network traffic available for inspection, including the payload, the quality of their data would improve significantly, thus aiding their investigation. However, this is not feasible, due to various laws prohibiting such surveillance. In corporate use, the cost associated with storing all network traffic may not be justifiable.

There is a need, therefore, for an improved method, article of manufacture, and apparatus for monitoring network traffic.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

An embodiment of the invention will be described with reference to a computer system on which a network traffic analysis program executes, but it should be understood that the principles of the invention are not limited to this particular configuration. Rather, they may be applied to any system in which network data traffic is scanned or transmitted, either on a local or remote device, and the system may comprise one or more devices. Although the methods herein are described in terms of their application to Internet network data traffic analysis, one skilled in the art will recognize that they are equally applicable to other cases for which it is desirable to scan data traffic, including but not limited to internal corporate networks. Disclosed herein are a method and system to log and archive network data traffic, such as Internet traffic, in such a manner as to make the log searchable and relevant to various investigations without storing the actual data traffic payload (content) or necessarily providing the surveilled payload to any parties.

Figure 1:
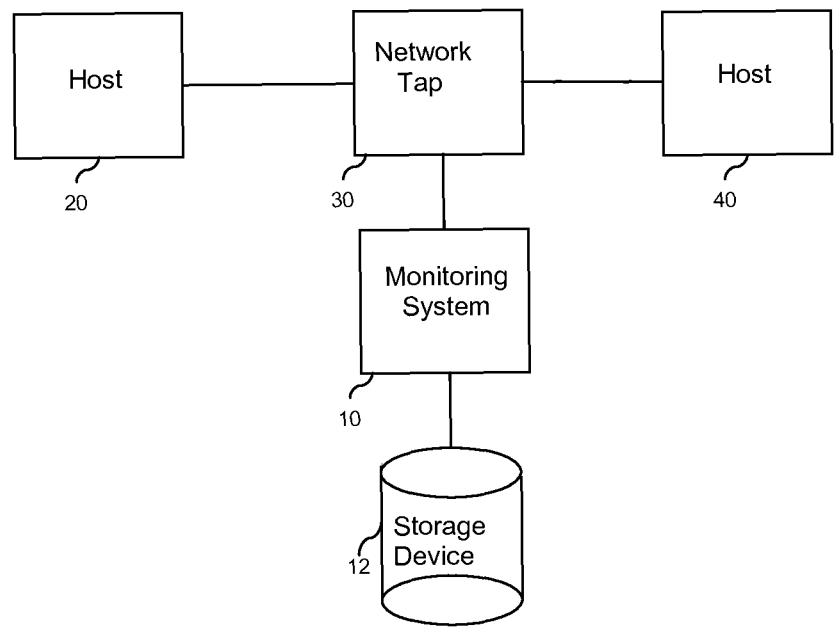
FIG. 1 is a diagram of an embodiment of a system in accordance with the invention.
Figure 2:
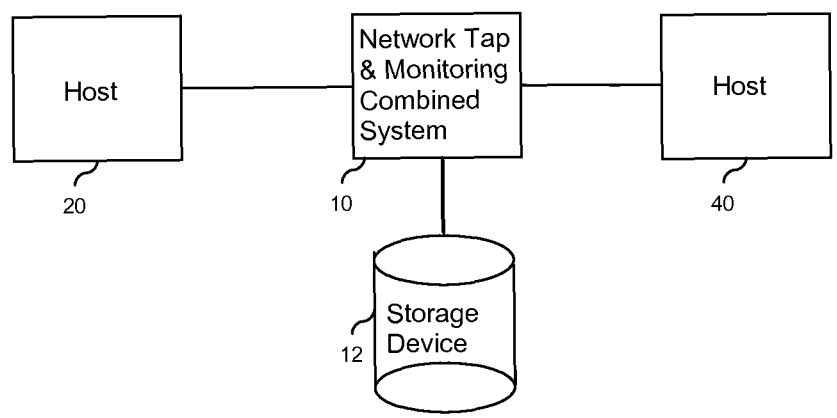
FIG. 2 is a diagram of an embodiment of a system in accordance with the invention.

FIG. 1 illustrates a configuration in which a network traffic monitoring system comprising a network traffic analysis program executing on a computer system 10 could be used to scan network data traffic. As shown in FIG. 1, a network tap 30 may be used, in which a passive data tap is placed in the data path between host 20 and host 40, and all traffic flowing through the tap 30 is visible to the monitoring system 10. Common networking mirroring methods may be used, in which network traffic is essentially "cloned" and the cloned traffic is via a monitoring port to the monitoring system 10 or an IP address for the monitoring system 10. A storage device 12 is provided for storing data from the monitoring system 10. In some embodiments, an active tap may be placed inline with the traffic, thereby acting as a "man-in-the-middle." In this configuration, the active tap may control the flow of traffic as well as monitor all traffic that flows through it. The functionality of the network tap and monitoring system may be combined into one system 10, as shown in FIG. 2. It should be understood that the above methods are presented by way of illustration and are not intended to be limiting. Various methods of monitoring network data traffic may be used, singly or in combination, without departing from the spirit of the invention. For example, other components may be added to the configuration of FIG. 1 to perform functionality of the monitoring system 10. Storage can be provided in a variety of ways, such as through a NAS (network attached storage), a SAN (storage area network), or other configuration.

The network traffic monitoring system 10 may be used to process network traffic as will be described herein. In some embodiments, data may be collected by the monitoring system 10 directly from the network data traffic. This information may be considered "intrinsic" in that the information is extractable from the packets directly (such as by inspection of the packet headers) and is intended to be understood by common network equipment. Some processing may be involved, such as the determination of the packet's beginning and end points, its type (such as TCP or UDP, etc.), and the relevant subset of data within the packet (such as source address). Such intrinsic data may include source address, destination address, source MAC (Media Access Control) address, destination MAC, protocol, route taken, time/date, packet size, bandwidth, physical port number, logical port number, etc.

Data may be determined from examination of the network data traffic payload; e.g., content derived metadata. This information may be considered to be "extrinsic" in that the data has no intended meaning to common network equipment such as switches, routers, network interface cards, etc., and the data may reside in a combination of locations such as the packet header and the payload.

Figure 3:
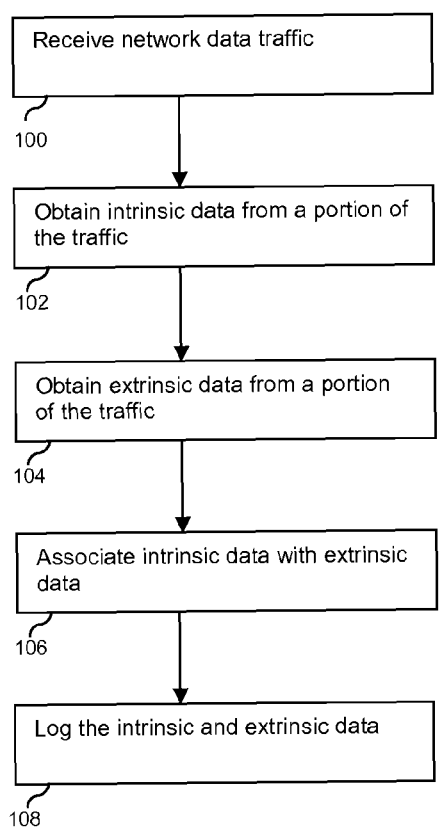
FIG. 3 is a flowchart illustrating a process for analyzing traffic in some embodiments of the invention.

FIG. 3 illustrates a process flow in some embodiments. As shown, the process includes receiving network data traffic in step 100. Intrinsic data is obtained from a portion of the data traffic, step 102, such as by inspection of packet headers in the portion examined. Extrinsic data is obtained from a portion of the data traffic, step 104, by analyzing its payload. In some embodiments, the extrinsic data may be obtained from the same portion of data traffic from which the intrinsic data is obtained, though it may be useful in some cases to obtain intrinsic and extrinsic data from different portions of the traffic. In step 106, the intrinsic data is associated with the extrinsic data, and the intrinsic data and extrinsic data are logged, step 108.

In some embodiments, the data derived from examination of the network data traffic payload may include data about one or more of the following:

Application—indicates the application(s) associated with the network traffic. Examples: Kazaa, Skype, IM, email, file sharing, video conferencing, VoIP, etc. This may be determined by examining the payload and detecting characteristics unique to the application generating the traffic. Various techniques may be used to determine traffic type, such as those used in firewalls and network intrusion detection/protection systems. Some techniques may be based on the association of applications to specific ports or a sequence of ports. Others may use byte pattern matching. Techniques beyond port matching may be used because some applications do not have fixed port associations or they intentionally use ports associated with other applications in order to disguise their identity (such as when traffic is encapsulated over HTTP in order to pass through firewalls). Other techniques may be based on packet length, inter-arrival times, flow characteristics, etc., and combinations of multiple techniques may be used. Some applications may be easily identified if they embed an identifier in their packet header. Thus, various techniques of sniffing traffic may be used to identify traffic such as file transfers and then extract the additional data such as file name, date, etc.

File and object types—are there files or objects being transferred? If so, what file or object types are being used? Examples: document files (.doc, .pdf), image files (.bmp, .gif), multimedia files (.jpeg, .wav, .avi), database objects, data streams, etc.

Event Data—this may be considered a subset or more detailed aspect of Application data. For example, video cameras may also have event triggering capabilities where a data signal is sent based on a physical or video event (such as a door opening or movement within a certain region of the viewed area), or based on alarm signals. Derivation of event data may be performed using similar techniques for deriving application data.

Hash signature—when files or objects are being transferred, create a hash of the file. Various hash algorithms may be used, such as Secure Hash Algorithm or MD5.

Location—render the apparent geophysical location of all parties. This may be performed, for example, by lookup of an IP address's registration. In some embodiments, the lookup can be combined with (or compared to) the subscriber's address on file with the ISP.

Encryption—determine if the traffic is encrypted or otherwise unknown/unknowable. Encrypted traffic may be identified by the use of an encrypted traffic protocol such as HTTPS. Some traffic may not "self-identify" as encrypted, and various techniques may be used to identify such traffic. In some embodiments, the entropy of the traffic's payload is measured to determine whether it is encrypted, and may need to be distinguished from other high entropy data types such as image files, compressed files, etc.

Identity—determine whether identity information is contained within the payload. In some embodiments, a speaker recognition system may be used to examine voice data traffic (or other audio elements within other formats such as audio files, video files, etc.) to determine the identity of the speakers. Such identification may be permissible because the identity of the users is given. In some embodiments, a facial recognition system may be used with video or image traffic to determine the identities of people depicted. In some embodiments, object recognition may be used with video or other image formats in order to determine what objects are depicted, such as structures that might be considered high-profile targets.

Language—analyze text and audio elements to determine which languages are being used in the traffic. This may be done by attempting to match portions of the traffic to text and audio elements in lexicons for various languages.

Phonic Profile—determine if the traffic contains any of many types of sounds such as blasts, gunshots, crying, laughing, glass breaking, etc. This may be done by using an auditory recognition system to analyze the traffic.

Locale—determine the locale depicted in traffic containing images by applying image recognition systems against the traffic.

Word Spotting—determine if specific words were spoken by applying a word spotting system against the traffic.

Due to space requirements or legal issues, it may not be feasible to retain the traffic in nonvolatile storage, and in some cases, collection of specific information may be determined to be a violation of applicable laws or regulations (such as privacy). The traffic may be analyzed as described herein, and not retained permanently or stored in nonvolatile storage (except as needed for processing). In some embodiments, the data can be rendered in such a manner as to classify the traffic rather than to identify the specific data item contained in the traffic. For example, rather than identifying specific words contained in the traffic, a lexicon containing words, phrases, or utterances determined to be related to drug trafficking may be used to compare against the traffic. If one or more of the contents of the lexicon match the traffic, the data stored would be the lexicon's ID rather than the word itself, as storing the lexicon's ID may be more appropriate from a privacy standpoint. Information regarding words in the lexicon that were matched may be stored, but this may depend on whether it is considered appropriate to do so under privacy laws. In this manner, the traffic is classified according to a general category but the specific words, etc. are neither retained (beyond any buffering or temporary storage needed for analysis) nor provided to any third party. The investigating/monitoring agency never sees or hears what was communicated, which may help in avoiding violating applicable laws or regulations.

In some embodiments, explicit identification of various participants within a network traffic stream may be used. In some embodiments, anonymous identity markers may be created and later used for correlation and identification purposes.

For example, such an approach might be used in processing a voice call carried over a network in which there are two parties. Each party's voice may be identified in the call and submitted to a speaker recognition engine. A speaker template, which may include features identified by pattern recognition technology, is created for each party. These speaker templates may be based on various speaker recognition technologies such as word-dependent or word-independent recognition. In some embodiments, these speaker templates may be further identified by a hash of the template that will allow the template to be easily indexed and searched for. The template and hash may be retained as data about the network traffic (metadata). Over time, additional traffic is logged using this approach. If the speaker template does not match to an existing speaker template, the network traffic analysis system may create a new one, and associate a new log to that template. If it matches an existing template, the additional traffic is logged to that existing template and a speaker identification number (ID) is associated with these templates. Every time the same speaker communicates through the logged service, his/her speaker template will be created, logged, and associated with the speaker identification number.

Figure 4:
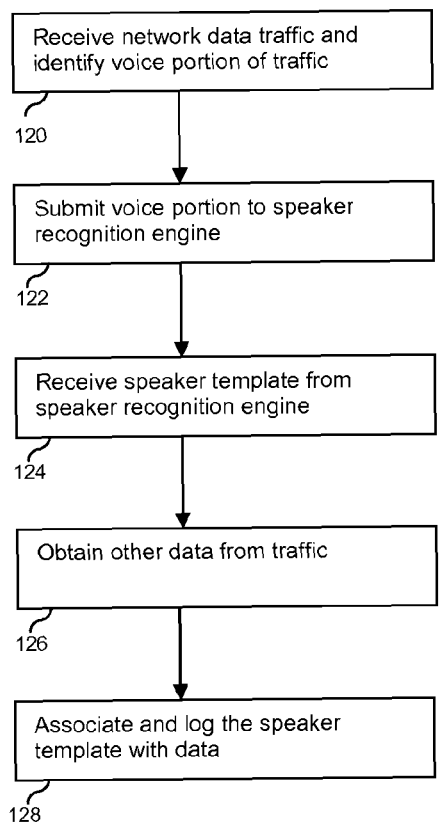
FIG. 4 is a flowchart illustrating a process for analyzing voice traffic over a network in some embodiments of the invention.

FIG. 4 illustrates a process flow in some embodiments for processing voice traffic. In step 120, the system receives network data traffic and identifies a voice portion of the data traffic. The voice portion is submitted to a speaker recognition engine, step 122, which returns a speaker template, step 124. Other data (intrinsic and/or extrinsic) may be derived from the traffic, step 126. This data is associated with the speaker template and logged, step 128. More than one voice may be recognized in the voice traffic, and a plurality of speaker templates may be provided by the speech recognition engine.

In some embodiments, a template is created each time speech is detected, with the goal of associating all traffic containing speech from the same (unknown) speaker. Thus, if the system detects only one speech sample of a speaker it will have only one template for that speaker. However, as the system gathers more speech traffic, a new template can be created for each sample (the samples could in some embodiments be session based; i.e., per phone call, transmission, and so on). When the system has more than one sample, it can determine the degree of similarity between the templates and form the appropriate associations. In some embodiments, this may entail keeping the templates for each session.

Many speaker recognition technologies may be used, such as word-independent or word-dependent technologies. Word-independent speaker recognition would not rely on specific pre-selected words in the analysis. Using word-dependent technologies, specific words may be identified within the speech stream, and once those words are identified (which may be commonly used words that would likely appear in all communications), the system could then create a speaker recognition template of those specific words. By collecting speaker recognition templates based on known words (i.e. the text), the system may be able to achieve a higher degree of accuracy.

By rendering and logging these speaker templates, it is possible in some embodiments to correlate and track a given speaker over diverse communications paths even though the actual identity of the speaker remains unknown. At some point it may be permitted to obtain speech samples of people of interest and use those as the basis to connect the speaker's actual identity to the anonymous log of speaker templates. This may be very useful for investigative and legal purposes, because it may be possible to obtain a warrant for one party's speech template and then obtain additional warrants for other parties based on the results of the correlation between the known party and the unknown parties. This approach may also enable the identification of all logged traffic once the actual identity is known.

In some embodiments, a similar approach may be used with facial recognition and other forms of recognition where the item being identified is rendered as an anonymous mathematical abstraction. Thus, faces may be rendered as templates, and traffic bearing the same templates may be correlated and searched. Until a connection is made to the actual identity of the person (or item), the data is anonymous and its collection would presumably not run afoul of privacy or other laws or regulations.

In some embodiments, network traffic in its entirety (including payload) may be recorded and archived based on content derived data. A policy engine may be used to store and implement policies that direct the network traffic analysis system to take (or refrain from) certain actions. For example, if the traffic is encrypted, a policy could be used to trigger recording of the entire traffic. This may be legally allowable because the traffic's content is not viewable to anyone without the decryption key. This key may be stored in a location apart from the stored traffic, such as for legal reasons. The key storage location may be one not under direct control of investigative or law enforcement agencies, so that a court order or authorization (which could require probable cause or a reasonable suspicion) would be required to view the stored traffic.

There may be value in keeping this traffic for forensic purposes, and it may serve as evidence. At the most basic level, portions of the traffic may have been rendered as a file on the user's computer. Also, based on other evidence and cause, the monitoring agency may obtain legal permission to view the user's private data. In such cases, it may be possible to compel the key holder (which could be the user or a third party such as a service provider; e.g., Yahoo Instant Messenger) to provide the key in order to decrypt the recorded data traffic. This could then be compared to the file on the user's computer.

Various methods and formats may be used for logging data derived from the network traffic. In some embodiments, the log may include a database. The database may be used to contain records where each record could contain the traffic file itself (such as a .cap, .pcap file, etc.) and all the relevant data (such as the speaker recognition template) as well as additional data derived and/or extracted from the traffic itself so that the record can be easily searched. In some embodiments, a less structured approach may be used, with a plurality of files or objects associated by a naming scheme or other methods of organization. The goal would be to be able to search through the logs and identify and correlate all the relevant elements.

Thus, in some embodiments, the system has the ability to capture data in a manner that informs an observer of the characteristics of the data without revealing the specific content of the data or the explicit identity of the communicators but retains investigative value. Sniffer files or other such log files may simply be raw traffic presented in per-packet fashion and when possible with known protocol and payload fields decoded. Sniffer files might contain the exact content of the communication, which could be problematic from a privacy standpoint. Keeping these might violate the privacy of the originator and therefore not be permitted as a logging scheme. On the other hand, investigators are allowed to know the identity of the ISP customer and can presumably identify the identity of the remote parties in multiparty communications. The allowed information is not anonymous but it is thus limited due to the need to preserve the identity of the parties. Some approaches may classify and search for traffic that would be of interest to an investigator, to provide information such as descriptions of the types of communications, the types of data being communicated, the anonymous characteristics of participants in a communication, the possible location of the participants, and the specific identity of specific data files and objects without necessarily disclosing the content of the file or object at all. Information such as hash of the files/objects, location information, speaker identity templates, etc. could be retained.

For example, by having the hash of a particular file, investigators can use this hash to trace/track its movement and sharing. Music files or porn files could be identified as having come from one person and then transmitted to another and then to another and so on. At some point the investigator may obtain permission to inspect a subject's computer, take an inventory of files and data objects, and generate their hashes. This inventory can be compared to the database/log of traffic created by the network traffic monitoring system. If there is a match between the hashes one would then know the transmission path (chain of custody) and the timeline of custody of the files/objects. The use of the system with hash values and other data in anonymous form facilitates this while complying with privacy requirements.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for monitoring voice traffic on a network comprising network equipment, the method comprising:
   identifying a voice portion of the traffic;
   submitting the voice portion of the traffic to a speaker recognition engine;
   receiving a speaker template from the speaker recognition engine;
   obtaining data from the voice portion of the traffic, wherein the data includes intrinsic data and extrinsic data,
      wherein intrinsic data is derived from packet headers of the traffic,
      wherein extrinsic data is derived from payload of the traffic,
      wherein obtaining extrinsic data includes obtaining an associated lexicon identification, wherein the associated lexicon identification is used to classify the traffic, and
      associating the intrinsic data with the extrinsic data;
   associating the speaker template with the data, wherein a speaker identification number is associated with the speaker template, wherein the speaker identification number and information regarding the speaker template is included in the intrinsic data;
   logging the speaker template, the data, and the association in a log, wherein the log is stored on a storage device;
   comparing the speaker template to at least one existing speaker template;
   creating a new speaker template if the speaker template does not match to the at least one existing speaker template; and
   not retaining the portion of the traffic from which the speaker template was obtained.

2. The method as recited in claim 1, wherein obtaining intrinsic data includes examining headers of packets in a portion of the traffic.

3. The method as recited in claim 2, wherein the intrinsic data includes at least one of the group comprising source address, destination address, source media access control (MAC) address, destination MAC address, protocol, route taken, time, date, package size, bandwidth, physical port number, and logical port number.

4. The method as recited in claim 1, wherein obtaining extrinsic data includes deriving data based on content within a portion of the traffic.

5. The method as recited in claim 4, wherein the extrinsic data includes information about at least one of the group comprising application, file or object type, event data, hash signature, location, encryption, identity, and locale depicted.

6. The method as recited in claim 1, further comprising receiving a provided speaker template and comparing the provided speaker template to a speaker template in the log to determine if there is a match.

7. The method as recited in claim 6, further comprising retrieving the data associated with the speaker template if there is a match.

8. The method as recited in claim 1, wherein comparing the speaker template to at least one existing speaker template includes retrieving the at least one existing speaker template from the log.

9. The method as recited in claim 1, further comprising indicating a match between the speaker template and the at least one existing speaker template if there is a match.

10. The method as recited in claim 9, further comprising logging the indication of the match.

11. A method for monitoring voice traffic on a network comprising network equipment, the method comprising:
    identifying a voice portion of the traffic;
    comparing the voice portion of the traffic to a lexicon to determine if there is a match, wherein the lexicon includes audio elements;
    obtaining data from the voice portion of the traffic, wherein the data includes intrinsic data and extrinsic data,
        wherein intrinsic data is derived from packet headers of the traffic,
        wherein extrinsic data is derived from payload of the traffic,
        wherein obtaining extrinsic data includes obtaining an associated lexicon identification, wherein the associated lexicon identification is used to classify the traffic, and
        associating the intrinsic data with the extrinsic data;
    logging the data with an identification of the lexicon in a log if there is a match between the voice portion of the traffic and the lexicon, wherein the log is stored in a storage device.

12. The method as recited in claim 11, wherein obtaining intrinsic data includes examining headers of packets in a portion of the traffic.

13. The method as recited in claim 12, wherein the intrinsic data includes at least one of the group comprising source address, destination address, source media access control (MAC) address, destination MAC address, protocol, route taken, time, date, package size, bandwidth, physical port number, and logical port number.

14. The method as recited in claim 11, wherein obtaining extrinsic data includes deriving data based on content within a portion of the traffic.

15. The method as recited in claim 14, wherein the extrinsic data includes information about at least one of the group comprising application, file or object type, event data, hash signature, location, encryption, identity, and locale depicted.

16. The method as recited in claim 11, wherein the method is performed without retaining the voice portion of the traffic.

17. The method as recited in claim 11, further comprising:
    submitting the voice portion of the traffic to a speaker recognition engine;
    receiving a speaker template from the speaker recognition engine;
    associating the speaker template with the data; and
    logging the speaker template.

18. A computer program product for monitoring voice traffic in a network, comprising a non-transitory computer-readable storage medium encoded with a computer program, causing a computer to execute:
    identifying a voice portion of the traffic;
    submitting the voice portion of the traffic to a speaker recognition engine;
    receiving a speaker template from the speaker recognition engine;
    obtaining data from the voice portion of the traffic, wherein the data includes intrinsic data and extrinsic data,
        wherein intrinsic data is derived from packet headers of the traffic,
        wherein extrinsic data is derived from payload of the traffic,
        wherein obtaining extrinsic data includes obtaining an associated lexicon identification, wherein the associated lexicon identification is used to classify the traffic, and
        associating the intrinsic data with the extrinsic data;
    associating the speaker template with the data, wherein a speaker identification number is associated with the speaker template, wherein the speaker identification number and information regarding the speaker template is included in the intrinsic data;
    logging the speaker template, the data, and the association in a log, wherein the log is stored on a storage device;
    comparing the speaker template to at least one existing speaker template;
    creating a new speaker template if the speaker template does not match to the at least one existing speaker template; and
    not retaining the portion of the traffic from which the speaker template was obtained.

* * * * *